US012314987B2

(12) United States Patent
MacNeill et al.

(10) Patent No.: US 12,314,987 B2
(45) Date of Patent: May 27, 2025

(54) COST ASSESSMENT USER INTERFACE

(71) Applicant: Target Brands, Inc., Minneapolis, MN (US)

(72) Inventors: Kirsten MacNeill, Minneapolis, MN (US); Hanna Frahm, Minneapolis, MN (US); Nagarjuna Goud Bandamedi, Minneapolis, MN (US); Adam N. Morris, Minneapolis, MN (US); William Volkmeier, St. Michael, MN (US)

(73) Assignee: Target Brands, Inc., Minneapolis, MN (US)

( * ) Notice: Subject to any disclaimer, the term of this patent is extended or adjusted under 35 U.S.C. 154(b) by 212 days.

(21) Appl. No.: 17/568,205

(22) Filed: Jan. 4, 2022

(65) Prior Publication Data
US 2023/0214891 A1 Jul. 6, 2023

(51) Int. Cl.
*G06Q 30/0283* (2023.01)
*G06Q 30/0201* (2023.01)

(52) U.S. Cl.
CPC ..... *G06Q 30/0283* (2013.01); *G06Q 30/0206* (2013.01)

(58) Field of Classification Search
CPC ........................ G06Q 30/0283; G06Q 30/0206
See application file for complete search history.

(56) References Cited

U.S. PATENT DOCUMENTS

| 5,448,687 | A | 9/1995 | Hoogerhyde et al. |
| 5,796,614 | A | 8/1998 | Yamada |
| 6,801,908 | B1 * | 10/2004 | Fuloria ............... G06F 16/2428 |
| 7,516,556 | B2 | 4/2009 | Yepes Segovia et al. |
| 7,885,857 | B1 * | 2/2011 | Fukuya .............. G06Q 30/0603 705/26.5 |
| 8,170,946 | B2 | 5/2012 | Blair et al. |
| 8,249,738 | B2 | 8/2012 | Lastra et al. |
| 8,271,118 | B2 | 9/2012 | Pietsch et al. |
| 9,754,410 | B2 | 9/2017 | Hua et al. |
| 10,073,439 | B1 * | 9/2018 | Jacobs, II .......... G05B 19/4097 |
| 2001/0011222 | A1 | 8/2001 | Mclauchlin et al. |

(Continued)

FOREIGN PATENT DOCUMENTS

WO  WO-2004044671 A2 *  5/2004  ............. G06Q 10/06
WO  2014008479 A1  1/2014

OTHER PUBLICATIONS

Dong, Bo, et al. "Implementing mass customization in garment industry." Systems Engineering Procedia 3 (2012): 372-380. (Year: 2012).*

(Continued)

*Primary Examiner* — Emmett K. Walsh
(74) *Attorney, Agent, or Firm* — Merchant & Gould P.C.

(57) ABSTRACT

A cost assessment tool, method and system are disclosed. The cost assessment tool can parse a three-dimensional model to derive properties of a garment. The cost assessment tool can use the properties of the garment to assess the garment cost. The cost assessment tool can generate a user interface comprising the garment cost. In one example, the cost assessment tool can also use data related to garment production. In another example, the cost assessment tool can determine a fabric cost by using a representative size of a garment to determine a required fabric amount for a size range.

19 Claims, 14 Drawing Sheets

(56) References Cited

U.S. PATENT DOCUMENTS

| | | | |
|---|---|---|---|
| 2003/0187763 A1 | 10/2003 | Jordan et al. | |
| 2004/0243271 A1* | 12/2004 | Panebianco | A41H 43/00 |
| | | | 700/136 |
| 2006/0179012 A1 | 8/2006 | Jacobs | |
| 2013/0132273 A1* | 5/2013 | Stiege | G06Q 30/0283 |
| | | | 705/41 |
| 2015/0066189 A1* | 3/2015 | Mulligan | G06Q 30/0621 |
| | | | 700/136 |
| 2017/0352092 A1* | 12/2017 | Mitchell | G06T 15/503 |
| 2019/0340666 A1* | 11/2019 | Sekiyama | G06Q 30/0643 |
| 2020/0094579 A1 | 3/2020 | Dziesietnik | |
| 2021/0279779 A1* | 9/2021 | Jacobs, II | G06Q 30/0283 |
| 2022/0122483 A1* | 4/2022 | Krasley | G10L 15/18 |
| 2023/0051783 A1* | 2/2023 | Sights | G06T 15/04 |

OTHER PUBLICATIONS

Barrie, Leonie—3D Virtual Design and Fit Tools Keep Fashion on Track (Just-Style Home); Apr. 15, 2020; 4 Pages.

Sun et al., Envisioning the era of 3D printing: a conceptual model for the fashion industry: Article No. 25; 2017, 21 Pages.

Rushton, Joanne, How to Calculate a Product Development Cost Estimation for Design & Prototype Engineering; Jun. 23, 2020; 15 Pages.

McDermaid, Dave—What is Design to Cost? An Overview With Examples—Back to aPriori Blog Home (https://www.apriori.com/blog/); 2021; 6 Pages.

Taas, Inc.: Fashion You May Not Have Known—3D Digital Sampling for Fashion; Mar. 5, 2020; 22 Pages.

\* cited by examiner

3D GARMENT MODEL 402

|  | Solid | Stripe | Plaid |
|---|---|---|---|
| Fabric | $0.9013 | $1.4839 | $2.0973 |
| Trim | $0.1700 | $0.1700 | $0.1700 |
| Labor | $0.3772 | $0.9645 | $0.5051 |
| Overhead | $0.0377 | $0.0377 | $0.0377 |
| Shipping | $0.0310 | $0.0310 | $0.0310 |
| Packaging | $0.1500 | $0.1500 | $0.1500 |
| Estimated Cost | $1.6672 | $2.8371 | $2.9911 |

Name: Men's Hooded Sweatshirt
Category: Men's Casual
Last Design Edit: 2021-07-16
Brand: All In Motion 808 — Edit Design
810 — What-If?

COST ASSESMENT USER INTERFACE 800

FIG. 8

WHAT-IF COST ASSESSMENT USER INTERFACE 1000

| Fabric | $0.9013 |
|---|---|
| Trim | $0.1700 |
| Labor | $0.3772 |
| Overhead | $0.0377 |
| Shipping | $0.0310 |
| Packaging | $0.1500 |
| Estimated Cost | $1.6672 |

COST ASSESSMENT 1102A

| Fabric | $0.8451 |
|---|---|
| Trim | $0.1700 |
| Labor | $0.3461 |
| Overhead | $0.0377 |
| Shipping | $0.0310 |
| Packaging | $0.1500 |
| Estimated Cost | $1.5799 |

COST ASSESSMENT 1102b

| Fabric | $0.5816 |
|---|---|
| Trim | $0.1350 |
| Labor | $0.2752 |
| Overhead | $0.0377 |
| Shipping | $0.0290 |
| Packaging | $0.1200 |
| Estimated Cost | $1.1785 |

COST ASSESSMENT 1102C

COST ASSESSMENT COMPARISON USER INTERFACE 1100

FIG. 11

COST ASSESSMENT USER INTERFACE

BACKGROUND

Whether a product is commercially viable depends on its production cost. In the apparel industry, the design of a garment impacts its production cost. For example, selecting a particular design, such as a particular fabric, pattern, or feature, can have a substantial impact, particularly in the aggregate, on various costs that factor into the production cost, such as material costs, labor costs, or packaging costs. The same is true of other types of items, such as home goods, where fabrics and patterns may alter costs substantially It is difficult, however, to assess a product's production cost while the product is being designed. Designers, who are often not trained in cost assessment, use tools that are not equipped to assess the cost of a design choice. One limitation is that designers' tools do not generate the information required to assess production costs, such as how material measurements change by size, the required number of products by size, how much material is rendered unusable during production, how much labor is required, what the cost of labor is, how much shipping costs, and so on. Furthermore, such data is often not available at all to designers or product planners at the design stage, and even if it is available, it is often stored in differing formats in differing locations, making it impractical or time consuming to gather the required data.

This inability to easily assess a product's production cost at the design stage is a missed opportunity. For example, it is often easier to make a cost-conscious change to the product when that designer can understand the implication of the change in near-realtime, and in any event at the design stage than at a later stage of a product life cycle, such as the manufacturing stage or the distribution stage, at which point money may already have been spent on a garment that is not viable due to a high production cost. It is, in other words, more efficient for an enterprise to determine cost viability upfront at the design stage, rather than further downstream the product life cycle.

One way to assess a product's production cost at the design stage is to use a cost expert. For example, cost experts, who are often trained in assessing costs, can use characteristics of a particular design, along with other data, to estimate the production cost of a product, such as a garment, with that design. There are, however, drawbacks to this approach: it is mostly manual; the relevant data can have different formats and be in different locations; it can be expensive; the number of cost experts may be limited; and it can be inaccurate if the cost experts make a mistake. Another way to perform a cost assessment at the design stage is to get quotes from manufacturers for a particular design. Again, however, this approach has drawbacks: communication across different entities takes time and is prone to errors; it can be expensive; and the designer may not want to share design information or other information about the product with manufacturers.

Still further, given that it may be advantageous to iterate on a product design to improve the design while minimizing cost, it is often the case that a product designer would need to iteratively employ a cost expert as a design changes. However, this slows the overall design process, and adds unnecessary complexity, since it typically requires a design change, followed by a separate cost assessment, in an iterative manner.

Accordingly, improvements in tools available for cost assessment during retail item planning are desired.

SUMMARY

In general, the subject matter of the present invention relates to a tool that assesses the production cost of a product while the product is still in the design stage. More specifically, the present invention relates to a tool that, using a 3D digital model of a garment, can assess the cost of producing the garment. The tool can parse the 3D digital model for properties of the garment, and then use those properties, along with other data, to assess a garment cost. The tool can then generate an interface with the garment cost, broken down by the type of cost. Furthermore, a user can edit an aspect of the garment, and the tool can respond to this adjustment and provide an edited garment cost.

In an example aspect, a cost assessment tool comprises a processing unit and a memory communicatively coupled to the process unit, the memory storing instructions executable by the processing unit wherein the instructions, when executed, cause the cost assessment tool to: receive a three-dimensional model, the three-dimensional model comprising a garment; determine, by parsing the three-dimensional model, garment properties; determine, using the garment properties, a garment cost; and generate a cost assessment user interface, the cost assessment user interface comprising the garment cost.

In a second aspect, a method for assessing cost comprises: receiving a three-dimensional model, the three-dimensional model comprising a garment; determining, using the three-dimension model, garment properties; determining, using the garment properties, a garment cost; and displaying, via a cost assessment user interface, the garment cost.

In a third aspect, a cost assessment system comprises: a three-dimensional model parser; a cost calculator, the cost calculator communicatively coupled to the three-dimensional model parser; and a garment production database, the garment production database communicatively coupled to the cost calculator; wherein the three-dimensional model parser is configured to determine garment properties of a three-dimensional model comprising a garment; and wherein the cost calculator is configured to: receive garment properties from the three-dimensional parser; receive garment production data from the garment production database; and determine, using the garment properties and the garment production data, a garment cost.

BRIEF DESCRIPTION OF THE DRAWINGS

FIG. 8 illustrates an example of a cost assessment interface for a product.

FIG. 11 illustrates an example of a cost assessment comparison interface for multiple products.

DETAILED DESCRIPTION

Figure 1:
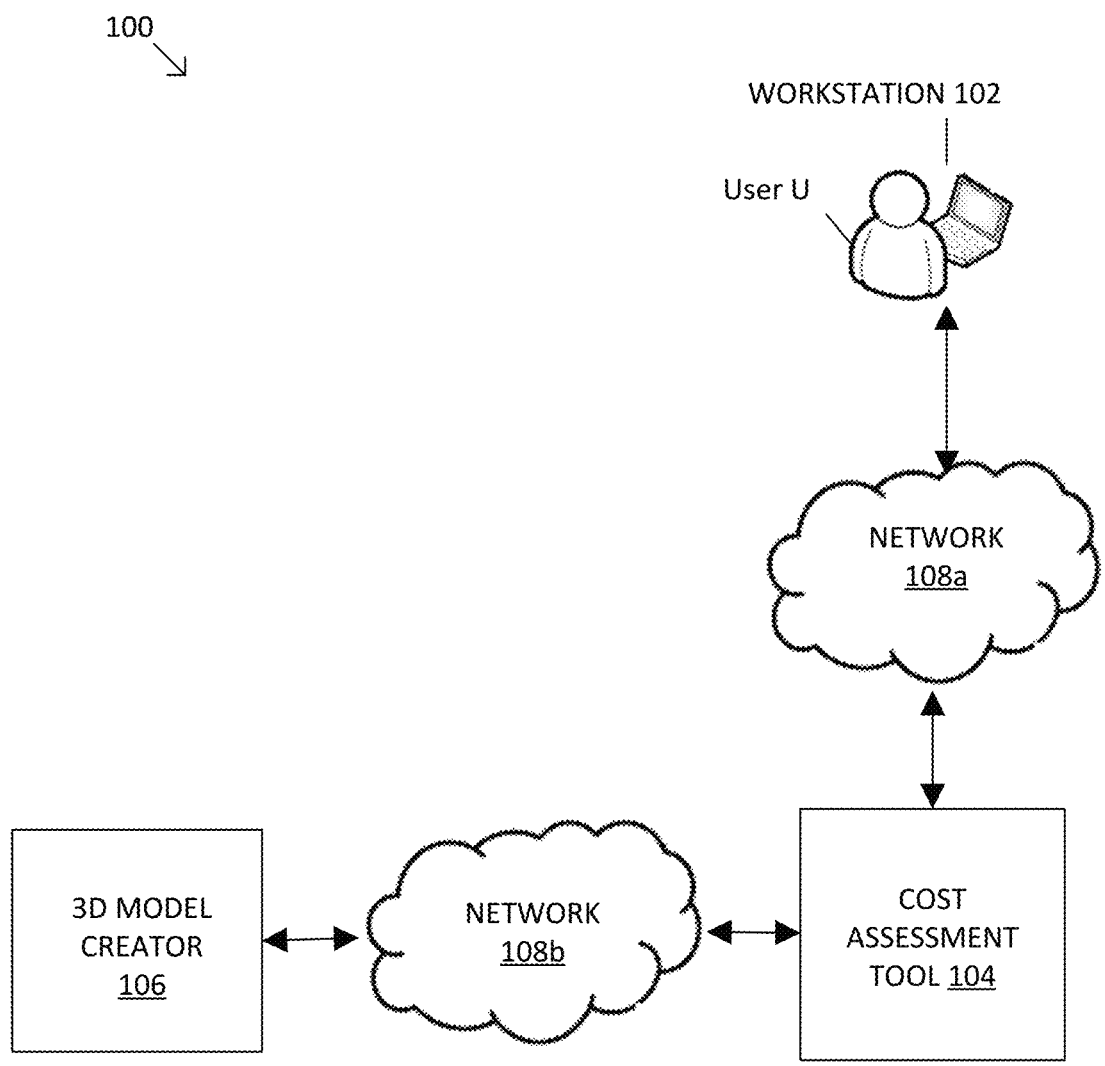
FIG. 1 illustrates a network in which aspects of the present disclosure can be implemented.

As briefly described above, embodiments of the present invention are directed to a cost assessment tool that determines a product cost for a designed product manufactured according to a variety of sizes, such as a garment. In example aspects, the cost assessment tool is configured to receive a three-dimensional (3D) model comprising a product, such as a garment. The cost assessment tool can parse the 3D model for properties of the product. Using these properties, along with other data, the cost assessment tool can determine the product cost. For example, the cost assessment tool can read information embedded within a 3D model—an object often used only for aesthetic purposes—and use that information to assess the cost of producing the product that the 3D model depicts. Furthermore, the product cost determined by the cost assessment tool can comprise various costs related to producing the product, such as fabric costs, material costs, shipping costs, labor costs, duty or tariff costs, overhead costs, packaging costs, miscellaneous costs, and any other costs related to producing the product or a plurality of the product, especially in a collection of different sizes.

In example aspects, the cost assessment tool can, using properties derived from the 3D model of a product such as a garment, determine a required fabric amount for a representative size of the garment, extrapolate from the representative size to determine a required fabric amount for a size range of the garment, and then determine the cost of this total required fabric amount. Additionally, the cost assessment tool can adjust the total required fabric amount to account for fabric shrinkage and waste, and the cost assessment tool can account for various demand levels of the garment at different sizes. Furthermore, in addition to assessing fabric costs, the cost assessment tool can use the garment properties derived from the 3D model and other data to assess other costs that factor into the garment's ultimate production cost, such as shipping costs, labor costs, duty or tariff costs, overhead costs, packaging costs, miscellaneous costs, other material costs, and any other costs related to producing the garment or a plurality of the garment.

In example aspects, the cost assessment tool can also generate a cost assessment user interface that reflects the product cost. The cost assessment interface can also include an image of the product, product details, other information related to the product, and other components, such as a user interface element (e.g., a button or other input interface) to edit the product design. Furthermore, the cost assessment interface can include a plurality of cost assessments, thereby allowing designers or product planners to compare cost assessments across designs. Additionally, the cost assessment interface provides a "what if" functionality that allows designers to see a change in cost assessment in response to an informal, or hypothetical, change to a design that does not require a precursor change the underlying 3D model.

The cost assessment tool described herein has a number of technical features that make it particularly advantageous over existing tools. In particular, in the garment design context, the cost assessment tool can easily be used by designers and product planners to assess the cost of a garment while the garment is still being designed, thereby allowing designers and product planners to make cost-conscious design decisions early in a product life cycle. By making such design choices at a retail enterprise early in a garment design process (e.g., before manufacture of an example garment), an enterprise can save money and more efficiently allocate resources to viable products or designs. Further, an enterprise can quickly, without requiring excess effort, integrate the cost assessment tool into existing design practices, because the cost assessment tool can receive a 3D model—which is already used by designers—as an input. The cost assessment tool eliminates, for example, the need to reformat or manually parse the 3D model in order to derive a cost assessment. Further, the cost assessment tool, by using properties of the 3D model, and by using historical and economic data related to garment production, can provide more accurate and more detailed cost estimates. Further, the cost assessment tool leverages data that otherwise might be impractical or time consuming to access or use.

In addition, the cost assessment tool can more accurately assess fabric costs by automatically extrapolating from a measurement of a representative size across a size range, while also making other adjustments to the required fabric amount. Further, the cost assessment tool can provide one or more interactive user interfaces that allow designers and product planners to understand the cost of a design choice and edit the design accordingly, thereby improving the efficiency of operations between a design or production unit and a business unit of an enterprise. As will be apparent, these are only some of the advantages offered by the invention of the present disclosure.

Referring now to FIG. 1, an example cost assessment network environment 100 is shown in which aspects of the present disclosure may be implemented. In the example shown, the cost assessment network environment 100 includes a workstation 102, a cost assessment tool 104, and a 3D model creator 106. As further described below in connection with FIG. 12, the workstation 102, the cost assessment tool 104, and the 3D model creator 106 can be implemented in a computing environment, such as computing environment 1202. Each of the workstation 102, the cost assessment tool 104, and the 3D model creator 106 can be implemented in the same computing environment or in different computing environments.

The cost assessment tool 104, which is further described below in connection with FIG. 2, includes components that can receive a 3D model of a garment, assess the cost of producing the garment, and generate a user interface comprising the garment cost.

Figure 4:
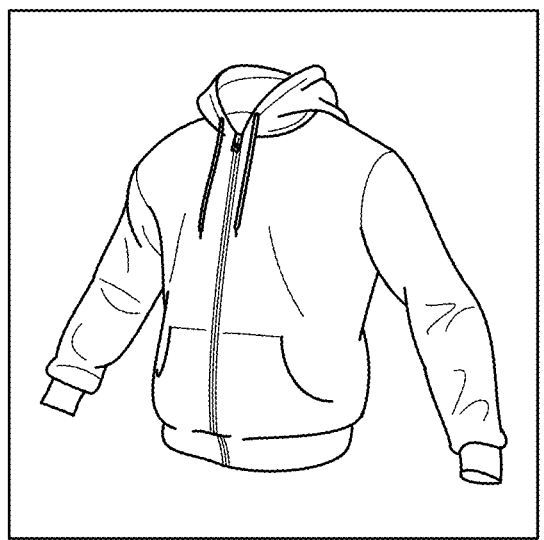
FIG. 4 illustrates an example 3D digital model that the cost assessment tool can receive.

The 3D model creator 106 can create—or can run a software program that creates—a 3D digital model (also, simply referred to herein as a "3D model"), such as, for example, the 3D garment model 402 of FIG. 4. In one example, the 3D model creator 106 and the workstation 102 can be the same device. In example embodiments, the 3D model creator 106 and the workstation 102 are used by designers or product planners working on a garment that is being designed. Designers or product planners can include, for example, product engineers, technical designers, cost engineers, and/or sourcing managers.

In example aspects, the 3D model creator 106 can be a third party 3D model creation software tool either operated by a user within a retail enterprise, or external from the retail enterprise. In particular embodiments, a user of the cost assessment tool 104, e.g., a user U at workstation 102, may receive a 3D model from the 3D model creator 106 in response to creation or receipt of such a 3D model of an item, such as a garment, fitted to a predetermined, representative size. In this example, user U at the workstation 102 may be a designer of a particular product and may wish to assess cost feasibility of a product depicted in the 3D model, but may lack the underlying data, skills, or experience necessary to make such an assessment manually. Furthermore, even if such a cost assessment at the stage of a 3D model were possible to be made by a cost estimator individual, such an arrangement is likely not scalable within an organization that makes a wide variety of products, including garments having particular cost targets and design parameters.

The cost assessment network environment 100 further includes networks 108a—b. In the example of FIG. 1, the workstation 102 and the cost assessment tool 104 are communicatively coupled via the network 108a, and the 3D model creator 106 and the cost assessment tool 104 are communicatively coupled via the network 108b. Each network of the networks 108a—b can be, for example, a wireless network, a wired network, a virtual network, the Internet, or any other type of network. Furthermore, each network of the networks 108a—b can be divided into subnetworks, and the subnetworks can be different types of networks or the same type of network.

As is further described below in connection with FIG. 3, the 3D model creator 106 can transmit, via the network 108b, a 3D model to the cost assessment tool 104. The cost assessment tool 104 can use the 3D model to discern properties of the garment, and the cost assessment tool 104 can use those properties to assess the cost of producing the garment. The cost assessment tool 104 can then generate a user interface and transmit that user interface, via the network 108a, to the workstation 102.

Figure 2:
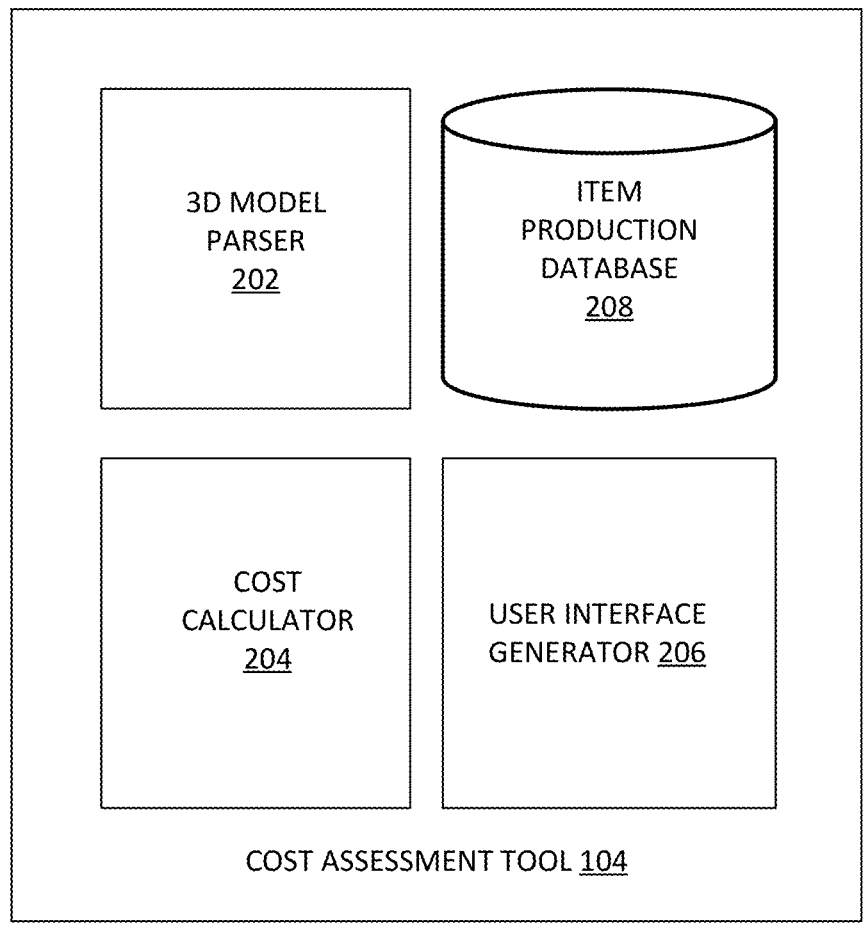
FIG. 2 is a block diagram of a cost assessment tool, according to an example embodiment of the present disclosure.

FIG. 2 illustrates example components of the cost assessment tool 104. In the example shown, the components of the cost assessment tool 104 can include a 3D model parser 202, a cost calculator 204, a user interface generator 206, and a garment production database 208. In one example, the components of cost assessment tool 104 can be implemented in the same computing environment, such as the computing environment 1202 described in connection with FIG. 12. In other examples, any one or more the 3D model parser 202, the cost calculator 204, the user interface generator 206, and the item production database 208 can be implemented in a different computing environment. In some examples, each component of the cost assessment tool 104 can be communicatively coupled to each other component of the cost assessment tool 104.

In the example shown, the 3D model parser 202 will analyze the received 3D model to determine characteristics of the 3D model. The characteristics of the 3D model may include a particular type and amount of material that is required to manufacture the item depicted in the 3D model. For example, in the case of a garment, the 3D model may be a representative size garment, and the 3D model parser may assess the representative garment to determine a type and amount of material required to manufacture the garment (e.g., the particular pieces required and dimensions of those pieces, number of buttons or other types of decorative items, etc.).

The cost calculator 204 includes a plurality of business rules and, using those business rules and historical production information from the production database 208, can generate a cost estimation for the particular item. In the case of a garment, the cost calculator 204 assesses historical records for similar garments, for example to determine costs of materials and labor required to manufacture such garments. Still further, the cost calculator 204 may determine this assessment based on an estimated efficiency in creating garments across a range of sizes from bulk material, using historical demand and sales figures, as well as historical and current potential layout of garment components on bulk material, as described below. Based on the various costs of, e.g., labor, material, supply chain and retail packaging, transport, etc., an overall estimated cost assessment may be generated by the cost calculator 204 prior to manufacture of a sample garment, and prior to submission of a given design to a garment manufacturer (e.g., a contract manufacturer external to the enterprise).

The user interface generator 206 may be a web service configured to present a user interface to a remote system, such as the workstation 102. In example embodiments, described below, the user interface generator 206 can generate a user interface that presents a graphical representation of the item (e.g., the garment), one or more cost properties of the item, a layout of subcomponents of the item in different sizes or other configurations within the context of stock material used to manufacture the item, for review by user U. By presenting each of these features to the user, that user, although being untrained in generation of a cost assessment themselves, may be able to graphically view a correlation between cost components of an item and the particular features, sizes, or configurations of items that are selected, so the user may more quickly iterate to fine-tune item configurations to achieve an appropriate cost target for the planned item.

Figure 3:
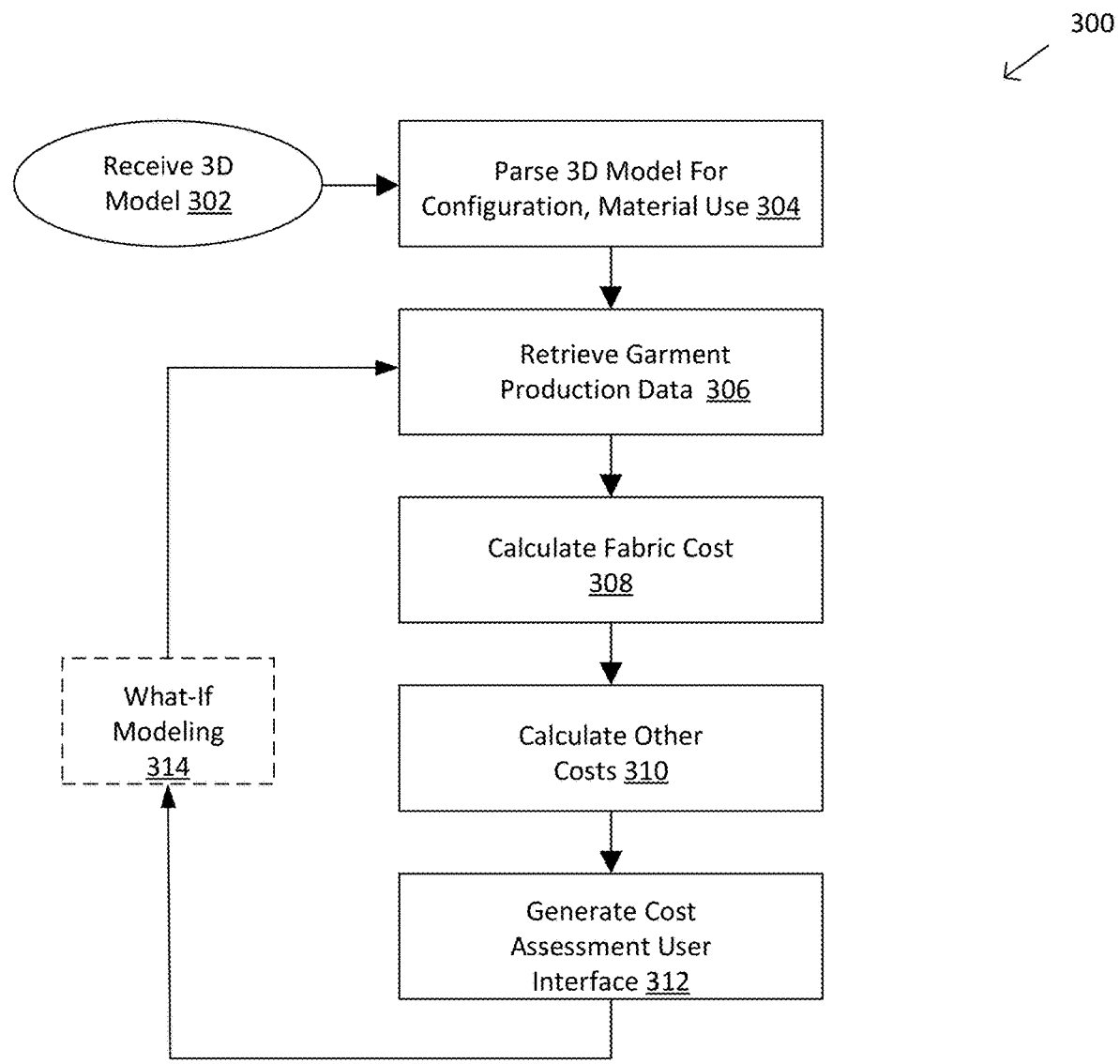
FIG. 3 is a flowchart illustrating an example of how the cost assessment tool can respond to receiving a 3D digital model.

FIG. 3 is a flowchart of a method 300, usable by the cost assessment tool 104 described herein. The components of the cost assessment tool 104, described in FIG. 2, are further described in connection with the method 300 of FIG. 3, in the context of generating a cost assessment for a garment. In describing the method 300, one or more components of the cost assessment tool performs each of the steps 302-314. In other examples, for each of the steps 302-314, a different component of the cost assessment tool can perform that step. In describing the method 300, reference is made to FIGS. 1-2 and FIGS. 4-10.

In the example shown, the method 300 is instantiated by receiving a 3D model (step 302). The cost assessment tool 104 can, for example, use the 3D model parser 202 to receive the 3D model. The 3D model parser 202 can receive one or more 3D models, and the one or more 3D models can include a garment. It is recognized that the method 300 is particularly adapted to performing analysis and cost assessment of garments, but may be adaptable to other types of designed items. Accordingly, below the method 300 is described in the context of garment design and assessment, but the present disclosure is not intended to be so limited.

FIG. 4 illustrates a 3D garment model 402, which is an example of a 3D model that can be received by the cost assessment tool 104 (at step 302). The 3D garment model 402 comprises a 3D model of a sweatshirt. The 3D garment model 402 can be rotated and spun. The 3D model can be created by the 3D model creator 106, or the 3D model can be created using the workstation 102 by editing a 3D model displayed on a user interface, such as cost assessment user interface 800 of FIG. 8. The 3D model can be a shape-based model, a polygonal model, a rational basis spline model, a non-uniform rational basis spline model, or any other 3D model created using computer-aided design software.

Returning to the example of the method 300 of FIG. 3, the cost assessment tool 104 can parse the 3D model (step 304). By parsing the 3D model, the cost assessment tool 104 can discern garment properties of the garment depicted in the 3D model. For example, the cost assessment tool 104 can use the 3D model parser 202 to parse the 3D garment model 402 of FIG. 4, and by doing so, can determine garment properties of the sweatshirt of the 3D garment model 402.

The garment properties can include anything related to the garment or to producing the garment. For example, garment properties can include: a type of garment, a garment measurement, a fabric type, a fabric pattern, a fabric color, a thread count, a stitch type, a size, logo or print information, a manufacturer identity, other information related to the manufacturer, a garment weight, accessory information, material information, brand information, trim information, or other information related to the garment. Additionally, the 3D model parser 202 can structure the garment property data. For example, the 3D model parser 202 can structure the garment properties in an Extensible Language Markup ("XML") format or in any other structured way (e.g., via Javascript Object Notation ("JSON"). In particular embodiments, the 3D model parser 202 may parse models received from a variety of different 3D software packages. The 3D model parser 202 can output the structured garment property data, and the cost calculator 204 can receive the structured garment property data.

In the example shown, the cost assessment tool 104 can retrieve garment production data (step 306). Garment production data can be stored in the garment production database 208. To retrieve the garment production data, the cost assessment tool 104 can use, for example, the 3D model parser 202 or the cost calculator 204.

Garment production data can include any data related to producing garments. In the context of the retail industry or other industries, data related to producing garments can include a wide range of data. Such data can, for example, relate to the entire process of owning the garment, which can encompass various phases in a product life cycle, such as, for example, manufacturing, packaging, and shipping garments. Furthermore, the garment production data can be historical data or economic data related to garment production. For example, the garment production data can relate to: the cost of a fabric, the cost of a type of garment, the cost of a trim, the cost of a stich type, the cost of a thread count, the labor required for a type of garment (e.g., complexity of construction) or for a type of fabric, other labor information, shipping costs, packaging costs, tariff or duty costs, overhead costs, demand by size for a garment, and any other data related to garment production.

Continuing with the example of the method 300, the cost assessment tool 104 can calculate a fabric cost (step 308). For example, the cost assessment tool 104 can use the cost calculator 204 to calculate an estimated fabric cost. To calculate the estimated fabric cost, the cost calculator 204 can assess an overall cost of fabric required to generate not just the garment depicted in the 3D model (which is a representative, known size) but also garments reflecting an expected distribution of sizes that would be manufactured for sale. Such an arrangement may include determining piece parts of garments across a size range, and arranging or configuring such piece parts virtually on bulk fabric (e.g., on a commercial fabric bolt) with minimal fabric waste.

In the example shown, the cost assessment tool 104 can calculate other costs (step 310). For example, the cost assessment tool 104 can use the cost calculator 204 to calculate other costs associated with owning or producing the garment, such as material costs, shipping costs, supply chain packaging costs, product packaging costs, tariff or duty costs, overhead costs, third party costs, miscellaneous costs, and other costs. To calculate any of these costs, the cost calculator 204 can use garment properties received from the 3D model parser 202, garment production data from the garment production database 208, or any other information determined in the method 300 of FIG. 3 or the method 500 of FIG. 5, described below.

For example, to calculate material costs, the cost calculator can, using the garment properties, recognize that the garment includes a zipper or buttons. As a further example, the cost calculator 204 can determine, based on the required fabric amount, how many labor hours are required to produce the garment. Then, using garment production data related to the cost of labor, the cost calculator 204 can determine a labor cost. In these and other ways, the cost calculator 204 can calculate other costs related to producing the garment. Furthermore, the cost calculator 204 can calculate costs for a plurality of the garment across a size range. And the cost calculator 204 can average the costs, resulting in a plurality of average costs per garment, such as an average labor cost, an average shipping cost, an average packaging cost, an average material cost, an average overhead cost, other average costs, and, as mentioned above, an average fabric cost.

Furthermore, the cost calculator 204 can determine, by combining fabric costs and any other costs, the garment cost. For example, the cost calculator 104 can add all the costs to determine the cost to produce the garment, a plurality of the garment, or an average of a plurality of the garment.

Continuing with the method 300, the cost assessment tool 104 can, for example, generate a cost assessment user interface (step 312). The cost assessment tool 104 can use the user interface generator 206 to generate a user interface. In generating the user interface, the user interface generator 206 can use, for example, garment properties derived by the 3D model parser 202 (at, for example, step 304), garment production data retrieved from the garment production database 208 (at, for example, step 306), and cost data determined by the cost calculator 204 (at, for example, steps 308-310). As further described below in connection with FIGS. 8-10, the user interface generator 206 can generate a user interface that includes, for example, an image of a garment, a garment cost, garment properties, and data related to the garment. Additionally, the user interface generator 206 can generate a plurality of such user interfaces, and the user interface generator 206 can store previously generated user interfaces. Referring to FIG. 1, the cost assessment tool 104 can, for example, transmit the one or more user interfaces, or data related to the one or more user interfaces, via the network 108a, to the workstation 102, which can then display the one or more user interfaces.

In the example shown, in some embodiments, the method 300 may include adjustment of one or more design elements of a product design to perform a "what if" analysis (step 314). The what if analysis allows a designer to quickly modify particular cost aspects of a design (e.g., by adding or removing design features such as pockets or buttons, or adjusting a material used), and automatically generating updated cost data without requiring re-generation of a new 3D model in order to see updated cost estimates based on quick, relatively informal changes. An example set of user interfaces showing one possible implementation of such a feature is provided below in conjunction with FIGS. 10A-10C.

Although specific method steps are shown, the method 300 is not limited to the steps 302-314. For example, the method 300 can have more or less steps than those shown. Additionally, the ordering of the operations is not limited to the order illustrated in FIG. 3.

Figure 5:
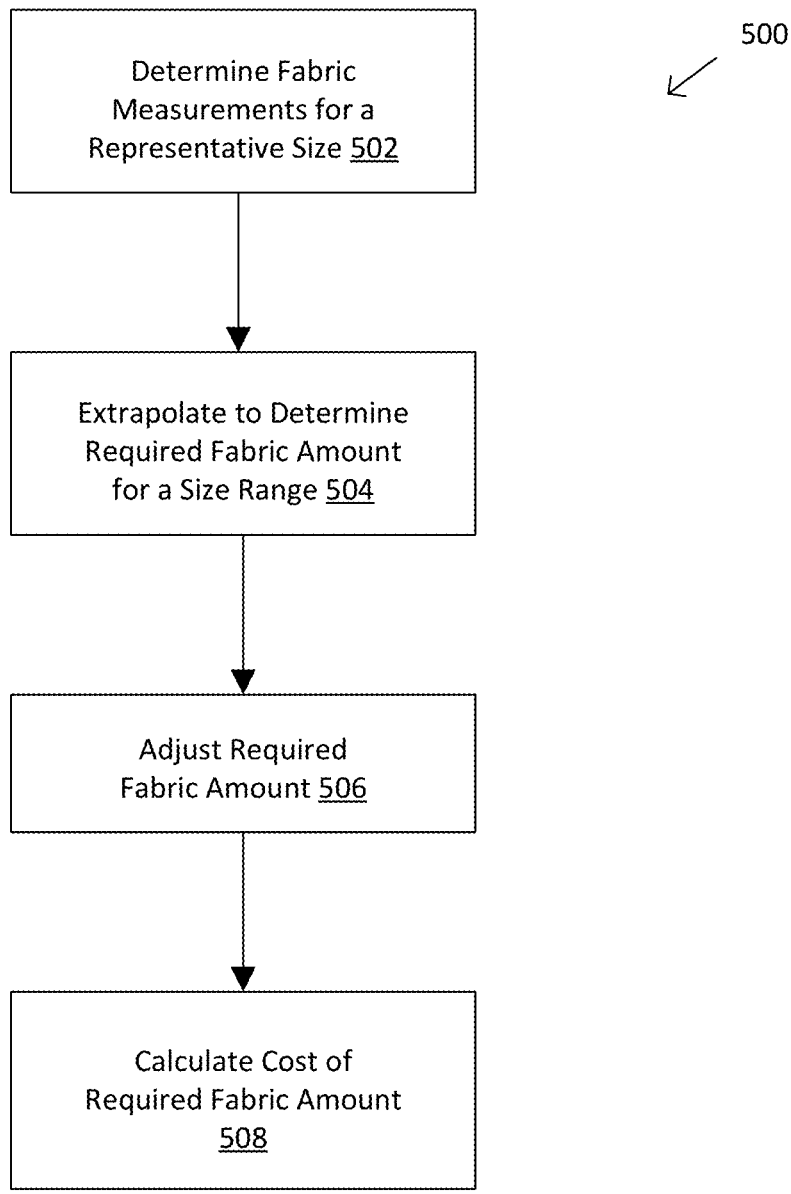
FIG. 5 is a flowchart illustrating an example of how the cost assessment tool can calculate a fabric cost.

Referring now to FIG. 5, an example method 500 is shown that may be useable by the cost calculator 204 to estimate costs for a particular garment. In describing the method 500, further reference is made to FIG. 6 and FIG. 7.

In the example shown, the cost calculator 204 can determine fabric measurements of a garment for a representative size (step 502). A representative size is a size of a range of sizes. For example, if the sizes for a particular garment include all sizes for babies, then the representative size can be 12 Months; or, if the garment is for adult men, then the representative size can be Medium ("M"). To determine the fabric measurements for a representative size, the cost calculator 204 can determine, using the garment properties received from the 3D model parser 202 or using data from the garment production database 208, a size range, a representative size, garment components, and garment component measurements. The garment properties may include not only these features, but a silhouette of the planned garment, which is obtained from the 3D model, and which may imply a particular amount of fabric or complexity of construction of a given garment. In example embodiments, a cost adjustment for a particular silhouette may be applied given a comparison to historical costs, or cost changes, based on the particular silhouette.

Figure 6:
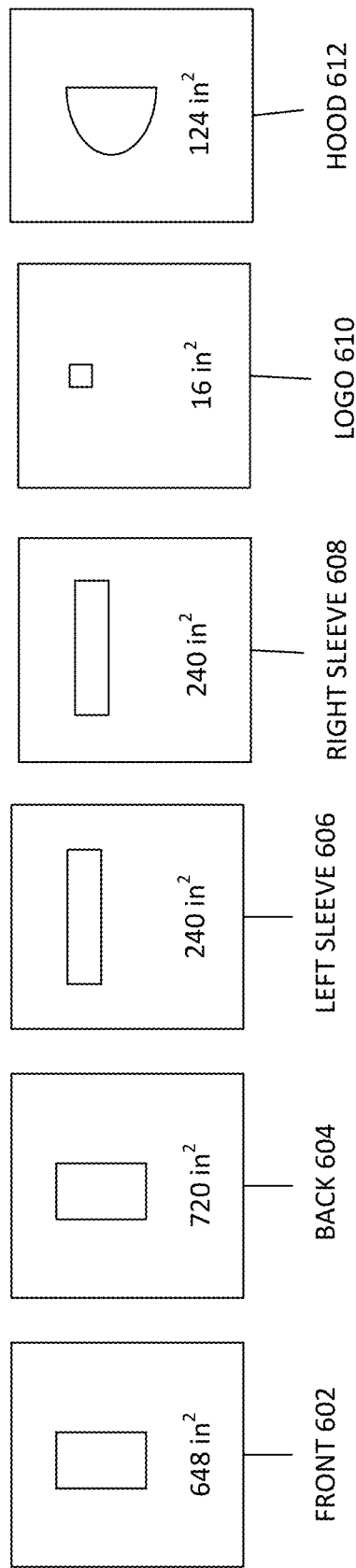
FIG. 6 illustrates an example of material lengths for garment components of a garment that is a representative size.

FIG. 6 illustrates representative size measurements 600. The representative size measurements 600 are examples of a required fabric amount for garment components of a representative size of a garment, such as the sweatshirt depicted in the 3D garment model 402 of FIG. 4. The representative size measurements 600 include measurements for the following garment components: a front 602, a back 604, a left sleeve 606, a right sleeve 608, a logo 610, and a hood 612. Other size measurements may be used as well, such as for left or right pockets, an inside hood lining, or other components of the garment.

For each garment component 602-612, a required fabric amount is shown. The garment components 602-612 are examples of possible garment components. Depending on the garment properties, more or less garment components than garment components 602-612 can be used by the cost calculator 204. The cost calculator 204 can use the garment components 602-612 to determine the required fabric amount for a garment of a representative size. For example, the cost calculator can, by summing the required fabric for each fabric component, determine the total required fabric to produce one garment of the representative size.

Furthermore, the cost calculator 204 can adjust, by accounting for shrinkage, the total required fabric to produce one garment of the representative size. As an example of how to do so, the cost calculator 204 can multiply, either individually or as a group, the measurements of the garment components by one or more shrinkage factors, or the cost calculator 204 can increase, by adding a constant, the measurements of the garment components 602-612. Furthermore, the cost calculator 204 can determine the amount of fabric required to produce a plurality of garments at the representative size. Furthermore, if a plurality of fabrics are used to produce a garment, as determined, for example, from the garment properties derived from the 3D model by the 3D model parser 202, the cost calculator 204 can combine the fabrics to determine combined fabric representative size measurements, or the cost calculator 204 can determine representative size measurements of the garment components 602-612 for each fabric individually.

Returning to the method 500 of FIG. 5, the cost calculator 204 can extrapolate from representative size measurements to determine a required fabric amount for a size range (step 504). For example, the size range for an adult men's sweatshirt can be from extra small ("XS") to extra large ("XL"), and the representative size can be M. Having determined the garment component measurements for size M (at step 502), the cost calculator 104 can determine an average cost across all sizes to be manufactured. To do so, the cost calculator 104 can, for example, use the garment component measurements for size M, either individually or as a combination, and adjust by a size proportion value for each size in the size range to determine an overall amount of fabric to produce a plurality of garments of each size in the size range, and then obtain an average cost based on that size range.

In examples, the cost calculator 204 can adjust the required fabric amount for the size range (step 506). For example, the cost calculator 204 can increase or decrease the required fabric amount depending on a demand for the garment at each size in the size range. To do so, the cost calculator 204 can use garment demand data from the garment production database 208. Using the demand data, the cost calculator 204 can, for example, for each size in the size range, increase the required fabric amount if the demand for the garment at the size is greater than a threshold, or decrease the required fabric amount if the demand for the garment at the size is less than a threshold. As a result, the cost calculator 204 can, in determining a required fabric amount for a garment across a size range, account for predetermined demands of the garment across the size range.

Figure 7:
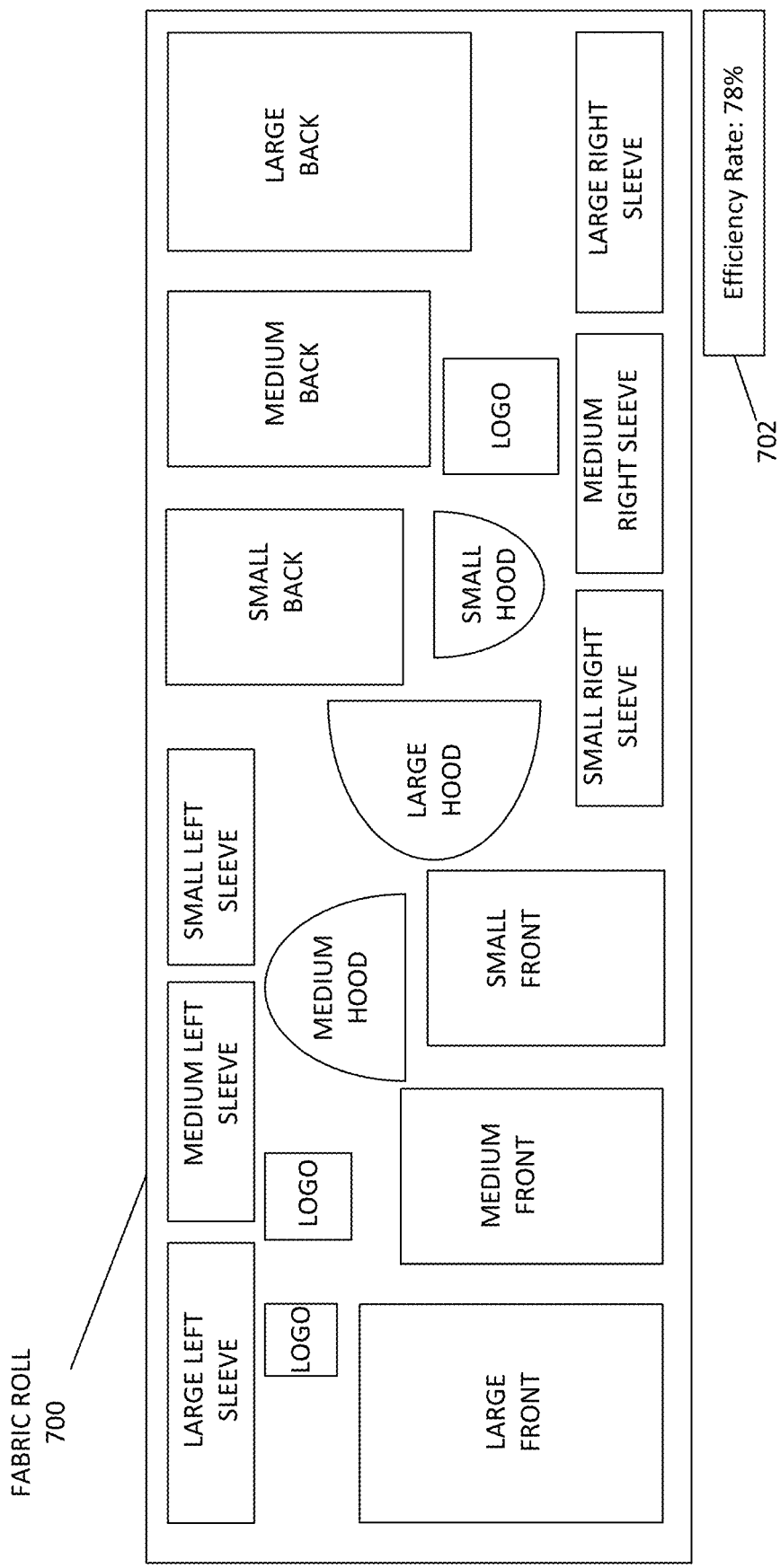
FIG. 7 illustrates an example of a material role that is used to provide fabric for a garment across a size range.

Still further, the cost calculator 204 can adjust the required fabric amount by accounting for production waste. FIG. 7 illustrates an example of how the cost calculator 204 can determine the production waste of producing a garment across a size range. In the example of FIG. 7, a material roll 700 is used to produce various garment components, such as, for example, the garment components 602-612, across a size range. In other examples, the material roll 700 can include more sizes of the garment, and the material roll 700 can include a plurality of garment components for each size.

An efficiency rate calculation 702 determines the percentage of the material of the material roll 700 that is used to produce garment components. In the example of FIG. 7, the efficiency rate calculation can yield a 78% efficiency rate. The fabric that is not used in producing garment products-22% of the material roll in the example of FIG. 7—is wasted fabric. To adjust for this wasted fabric, the cost calculator 204 can adjust, based on the efficiency rate, the total required fabric for the size range, resulting in a waste-adjusted required fabric amount for the size range.

In addition to adjusting the required fabric amount by garment demand and by production waste, the cost calculator 204 can make other adjustments to the required fabric amount, including adjusting for fabric shrinkage, seams, trims, and other garment properties.

Returning to the method 500 of FIG. 5, the cost calculator 204 can calculate the cost of the required fabric amount (step 508). To do so, the cost calculator 204 can combine the required fabric amount (determined, for example, at steps 502-506) with garment production data from the garment production database 208. For example, the cost calculator 204 can multiply the required fabric amount by a historical, current, or predicted cost of a unit of that fabric, resulting in a fabric cost. Furthermore, the cost calculator 204 can calculate an average fabric cost per garment of a plurality of garments, or a plurality of average fabric costs per garment. In another example, if a garment uses a plurality of fabrics with different costs, or if a fabric has a range of costs, the required fabric amount can be multiplied by the plurality of fabric costs, resulting in an estimated fabric cost range or a plurality of estimated fabric costs.

Referring generally to the method 500 of FIG. 5, although specific method steps are shown, the method 500 is not limited to the steps 502-508. For example, the method 500 can have more or less steps than those shown. Additionally, the ordering is not limited to the order illustrated in FIG. 5.

FIG. 8 illustrates a cost assessment user interface 800. The cost assessment user interface 800 can be a user interface generated by the cost assessment tool 104. The cost assessment user interface 800 comprises user interface components that relate to a garment. In the example of FIG. 8, the garment is a hooded sweatshirt. The user interface components of the cost assessment user interface 800 can include an image 802, garment details 804, a garment cost 806, and an edit design button 808. The cost assessment user interface 800 is an example: the cost assessment user interface 800 is not required to include all the displayed user interface components, the cost assessment user interface 800 can include more user interface components than those displayed, and the user interface components can be arranged differently than the arrangement illustrated in FIG. 8.

The image 802 can be, for example, a 3D model comprising the garment, or an image of a 3D model comprising the garment. The garment details 804 can include information related to the garment. For example, the garment details 804 can include a garment name, a category to which the garment belongs, a date that the garment was edited, a garment brand, and any other information related to the garment.

The garment cost 806 can comprise a cost producing the garment. The garment cost 806 can take various forms. For example, the garment cost 806 can include an average cost of producing a single garment based on costs of a full production run, or a total cost of producing a plurality of garments. In FIG. 8, the garment cost 806 comprises average production costs. Furthermore, the garment cost 806 can be illustrated in a cost assessment table, in which the cost of producing the garment is separated into sub-costs, such as a cost for fabric, trim, labor, overhead, shipping, and packaging. The garment cost 806 can include any number, including zero, of the sub-costs illustrated in FIG. 8, or the garment cost 806 can include more sub-costs than the sub-costs illustrated in FIG. 8. Furthermore, as depicted in FIG. 8, the garment cost 806 can include cost information for different patterns of the fabric, thereby allowing a user to compare production costs for different patterns or designs, such as a pattern including a solid color fabric, a striped fabric, and a plaid fabric.

The edit design button 808 allows a user of the workstation 102 to edit the design of the garment. For example, the cost assessment user interface 800 can be communicatively coupled with a program or system that creates or edits 3D models, such as the 3D model creator 106 of FIG. 1. By selecting the edit design button 808, the user can access such a program or system to edit the 3D model displayed in the image 802. Once the 3D model has been edited, an edited 3D model can be sent—from, for example, the cost assessment user interface 800 or from the 3D model creator 106—to the cost assessment tool 104. Then, having received the edited 3D model, the cost assessment tool 104 can execute the method 300 of FIG. 3, as described above.

Figure 9:
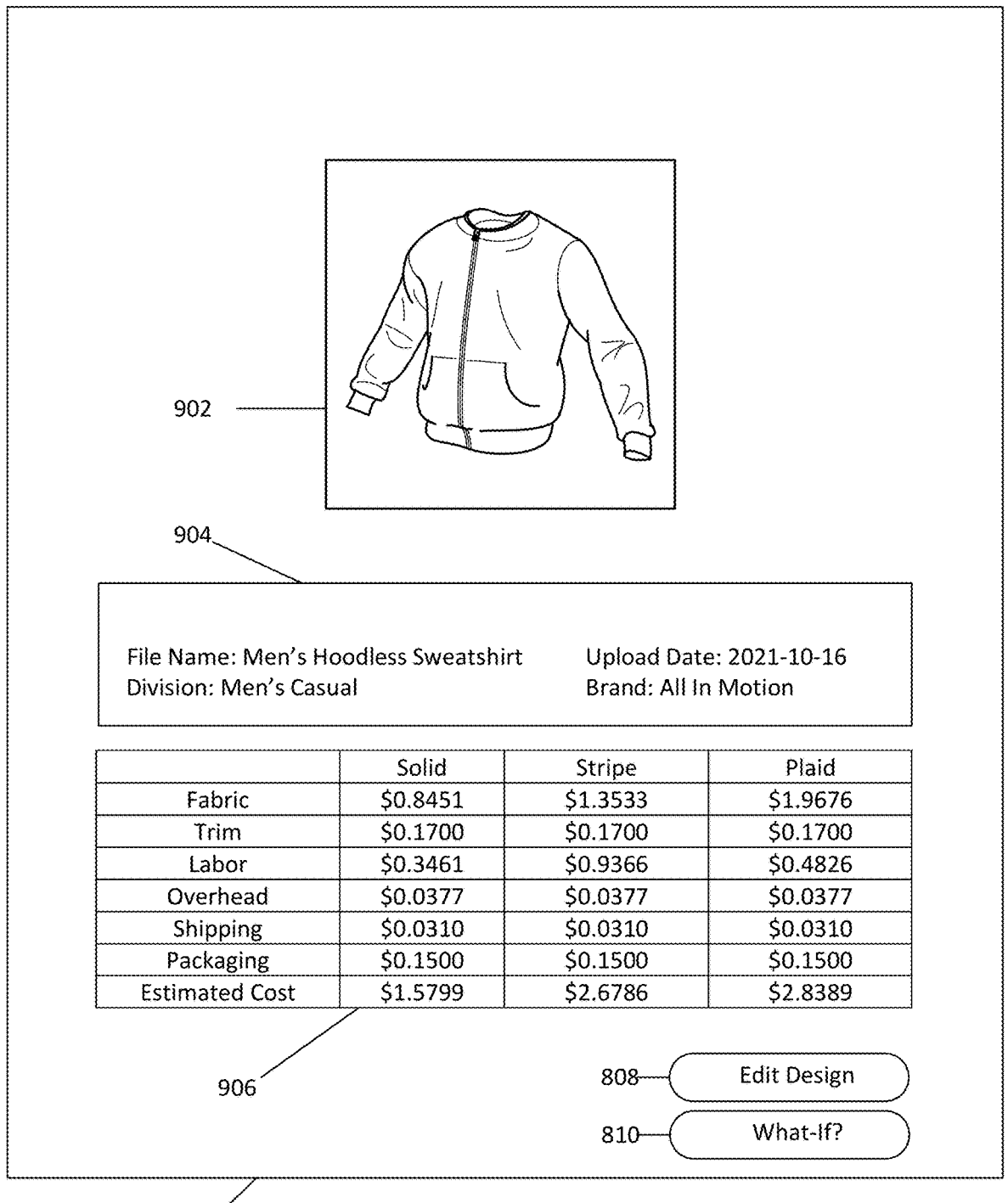
FIG. 9 illustrates another example of a cost assessment interface for a product.

FIG. 9 illustrates an edited cost assessment user interface 900. The cost assessment tool 104 can generate the edited cost assessment user interface 900, as described in connection with the method 300, in response to receiving the edited 3D model. Furthermore, the cost assessment tool 104 can transmit the edited cost assessment user interface 900 to the workstation 102. The edited cost assessment user interface 900 comprises user interface components that relate to an edited garment. These user interface components include an edited image 902, edited garment details 904, edited garment cost 906, and the edit design button 808 of FIG. 8. Similar to the cost assessment user interface 800, the edited cost assessment user interface 900 can contain more or less user interface components than the user interface components displayed in FIG. 9. Furthermore, the user interface components of the cost assessment user interface 900 can be arranged differently than they are arranged in FIG. 9.

The edited image 902 can be, for example, a 3D model comprising a garment, or an image of a 3D model comprising a garment. In the example of FIG. 9, the edited image 902 depicts a hoodless sweatshirt, which can be a design produced by removing, during the design process, the hood from the garment depicted in the image 802 of FIG. 8. The edited garment details 904 can include information related to the edited garment. For example, the edited garment details 904 can include an edited garment name, a category to which the edited garment belongs, a date that the edited garment design was edited, an edited garment brand, and any other information related to the edited garment.

The garment cost 906 can comprise a cost producing the edited garment. The garment cost 906 can be similar to the garment cost 806, except that, whereas the garment cost 806 relates to a cost of producing the garment of FIG. 8, the garment cost 906 relates to a cost of producing the edited garment of FIG. 9. Accordingly, like the garment cost 806, the garment cost 906 can vary depending on the example and embodiment. As described above, the edit design button 808 allows the user of the workstation 102 to edit the garment. Similar to the example of FIG. 8, the edit design button 808 of FIG. 9 allows the user to edit the edited garment.

Figure 10A:
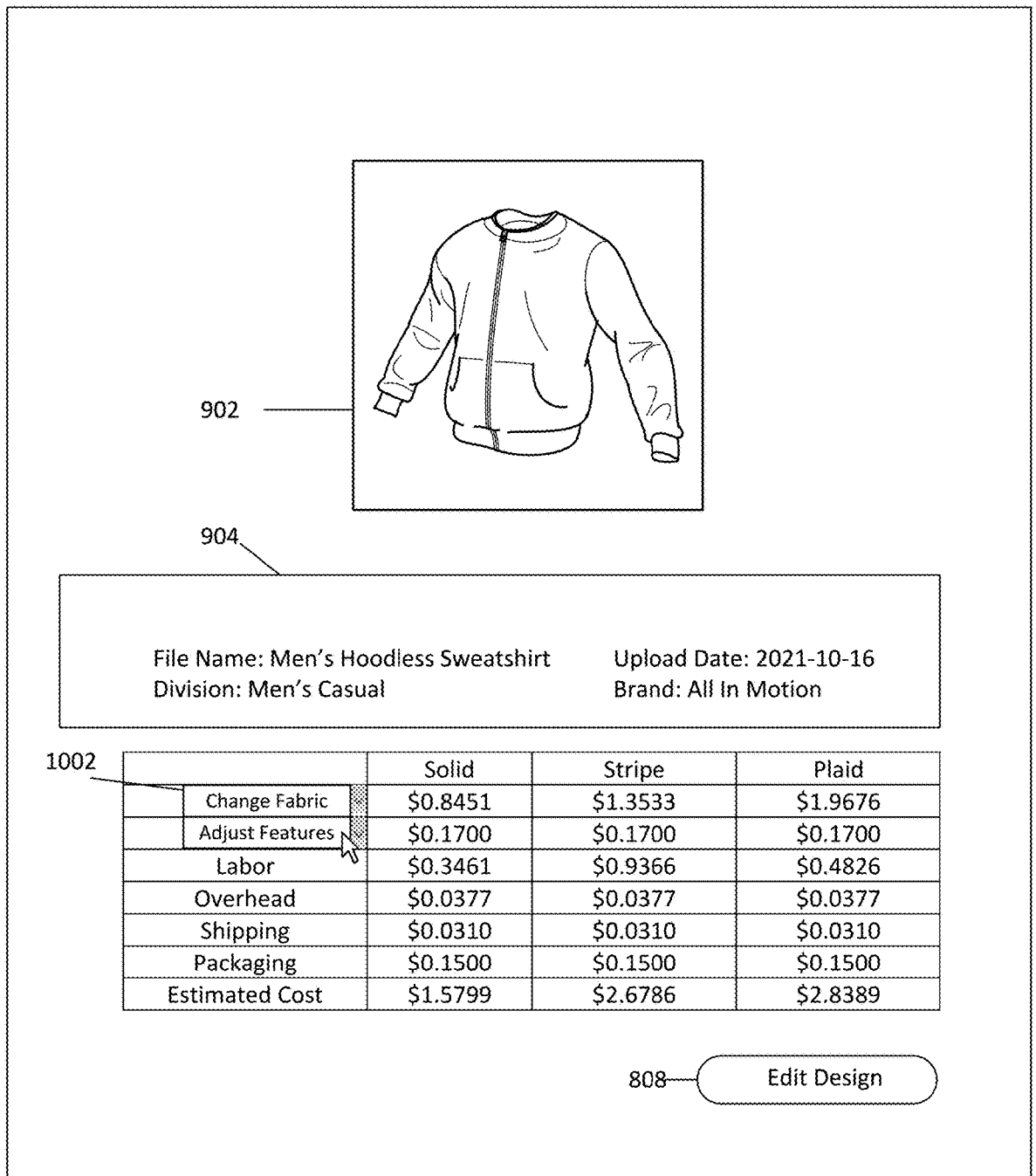
FIGS. 10A-10C illustrate examples of a "what if" cost assessment interface for a product.
Figure 10B:
Figure 10C:

FIGS. 10A-10C illustrate a "what if" cost assessment user interface 1000, in accordance with example embodiments of the present disclosure. In general, the "what if" cost assessment user interface 1000 displays the current 3D model of a garment being designed, but allows a user to adjust parameters of cost without adjusting the 3D model. This allows for quick assessment of cost effects in response to slight adjustments to the garment design.

In the example shown, the user interface 1000 allows a user to manipulate cost items without modification of an underlying 3D model or otherwise adjusting a product design to see how modifications of the design could affect cost without having to re-analyze that 3D model. For example, by selecting a "what if" option in the user interfaces 800, 900 described above, a user may be provided the functionality to change a variety of design parameters associated with the particular design. In the example of a garment as shown, the design parameters, such as fabric or trim, etc. may be adjusted. By adjusting one or more garment parameters, an overall cost effect on the garment may be seen. In the example shown, selection of a change to fabric may allow a user to select a type of change—a change in the fabric type itself (which may adjust overall cost of the fabric, but may also change a type of trim that would be used, or change labor costs associated with construction), or a change to features reflected in the fabric design, such as removal of pockets, etc. In the example seen in FIG. 10A, a selection is made from a drop down menu 1002 to change a garment feature rather than a fabric parameter. In FIG. 10B, a pop-up menu 1010 displays a variety of typical garment feature adjustments for selection, and removal of a pocket is selected. Of course, if a different selection to a change of features was made (e.g., to instead change a fabric selection), different options may be presented in the pop-up menu, such as to switch among a set of typically-used fabrics.

In FIG. 10C, an example set of changes to the cost assessment are displayed. As can be seen in FIG. 10C, the 3D model rendering has not changed, but some particular cost types have been adjusted to account for a change to the garment feature. In this example, a change to remove a pocket feature may have an effect of reducing fabric costs as well as labor costs of adding such pockets during manufacturing. In some other examples, other costs may be affected as well (e.g., trim costs). In the example shown, the what-if analysis provided in user interface 1000 allows users to see the costs adjust, as well as see a highlighting (shown schematically with asterisks) the types of cost elements that change in response to the selection before that user in fact modifies the 3D model.

FIG. 11 illustrates a cost assessment comparison user interface 1100. The cost assessment tool 104 can generate the cost assessment comparison user interface 1100. The cost assessment tool 104 can transmit the cost assessment comparison user interface 1000 to the workstation 102.

The cost assessment comparison user interface 1100 can include a plurality of cost assessments, such as the cost assessments 1102a—c. The user interface generator 206 can generate each of the cost assessments 1102a—c by, for example, using previously generated user interfaces, such as the cost assessment user interface 800 and the edited cost assessment user interface 900. Each of the cost assessments 1102a—c can include information related to producing a garment, such as the hooded sweatshirt of cost assessment 1102a, the hoodless sweatshirt of cost assessment 1102b, or the long-sleeve shirt of cost assessment 1102c. Furthermore, each of the cost assessment 1102a—c can include user interface components, such as the user interface components of the cost assessment user interface 800 of FIG. 8 or of the edited cost assessment user interface 900 of FIG. 9. For example, each of the cost assessments 1102a—c can include an image, a garment cost, and other information related to the garment. Furthermore, the cost assessment comparison user interface 1100 can include more components than the cost assessments 1002a—c. For example, the cost assessment comparison user interface 1100 can include interactive buttons or other information related to garment design or garment production.

Figure 12:
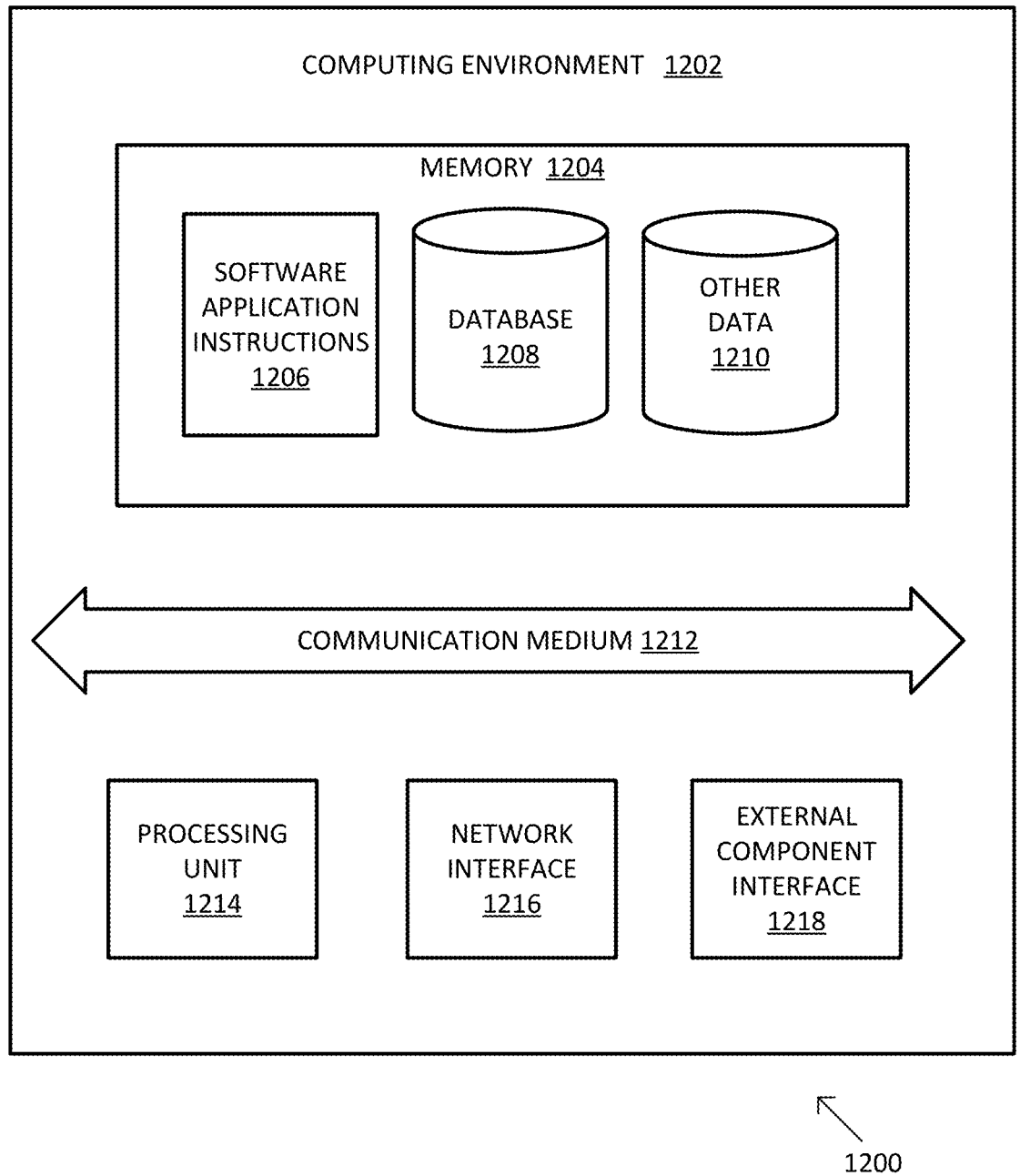
FIG. 12 illustrates an example block diagram of a computing system.

FIG. 12 illustrates an example system 1200 with which disclosed systems and methods can be used. In an example, the following can be implemented in one or more systems 1200 or in one or more systems having one or more components of system 1200: the workstation 102, the cost assessment tool 104, including, as described in connection with FIG. 2, the components of the cost assessment tool 104, and the 3D model creator 106.

In an example, the system 1200 can include a computing environment 1202. The computing environment 1202 can be a physical computing environment, a virtualized computing environment, or a combination thereof. The computing environment 1202 can include memory 1204, a communication medium 1212, one or more processing units 1214, a network interface 1216, and an external component interface 1218.

The memory 1204 can include a computer readable storage medium. The computer storage medium can be a device or article of manufacture that stores data and/or computer-executable instructions. The memory 1204 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 1204 can store various types of data and software. For example, as illustrated, the memory 1204 includes software application instructions 1106, one or more databases 1208, as well as other data 1210. In some examples (e.g., where the computing environment 1202 is the workstation 102 or the 3D model creator 106), the memory 1204 can include instructions for accessing the cost assessment tool 104.

The communication medium 1212 can facilitate communication among the components of the computing environment 1202. In an example, the communication medium 1212 can facilitate communication among the memory 1204, the one or more processing units 1214, the network interface 1216, and the external component interface 1218. The communications medium 1212 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 1214 can include physical or virtual units that selectively execute software instructions, such as the software application instructions 1206. In an example, the one or more processing units 1214 can be physical products comprising one or more integrated circuits. The one or more processing units 1214 can be implemented as one or more processing cores. In another example, one or more processing units 1214 are implemented as one or more separate microprocessors. In yet another example embodiment, the one or more processing units 1214 can include an application-specific integrated circuit (ASIC) that provides specific functionality. In yet another example, the one or more processing units 1214 provide specific functionality by using an ASIC and by executing computer-executable instructions.

The network interface 1216 enables the computing environment 1202 to send and receive data from a communication network (e.g., the networks 108a—b). The network interface 1216 can be implemented as an Ethernet interface, a token-ring network interface, a fiber optic network interface, a wireless network interface (e.g., Wi-Fi), or another type of network interface.

The external component interface 1218 enables the computing environment 1202 to communicate with external devices. For example, the external component interface 1218 can be a USB interface, Thunderbolt interface, a Lightning interface, a serial port interface, a parallel port interface, a PS/2 interface, or another type of interface that enables the computing environment 1202 to communicate with external devices. In various embodiments, the external component interface 1218 enables the computing environment 1202 to communicate with various external components, such as external storage devices, input devices, speakers, modems, media player docks, other computing devices, scanners, digital cameras, and fingerprint readers.

Although illustrated as being components of a single computing environment 1202, the components of the computing environment 1202 can be spread across multiple computing environments 1202. For example, one or more of instructions or data stored on the memory 1204 may be stored partially or entirely in a separate computing environment 1100 that is accessed over a network.

Depending on the size and scale of the computing environment 1202, it may be advantageous to include one or more load balancers to balance traffic across multiple physical or virtual machine nodes.

Aspects of the platform 1200 and the computing environment 1202 can be protected using a robust security model. In an example, users may be made to sign into the system using a directory service. Connection and credential information can be externalized from jobs using an application programming interface. Credentials can be stored in an encrypted repository in a secured operational data store database space. Privileges can be assigned based on a collaboration team and mapped to a Lightweight Directory Access Protocol (LDAP) Group membership. A self-service security model can be used to allow owners to assign others permissions on their objects (e.g., actions).

Each node may be configured to be capable of running the full platform 1200, such that portal can run and schedule jobs and serve the portal user interface as long as a single node remains functional. The environment 1202 may include monitoring technology to determine when a node is not functioning so an appropriate action can be taken.

This disclosure describes some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A cost assessment tool comprising:
a processing unit;
a memory communicatively coupled to the process unit, the memory storing instructions executable by the processing unit wherein the instructions, when executed, cause the cost assessment tool to:
receive a three-dimensional model, the three-dimensional model comprising a garment;
determine, by parsing the three-dimensional model, garment properties;
determine, using the garment properties, a garment cost; and
generate a cost assessment user interface, the cost assessment user interface comprising the garment cost and a menu for adjusting the garment properties without modifying the three-dimensional model;
receive, via a selection in the menu displayed in the cost assessment user interface, an adjustment to the garment properties;
update the garment cost based on the adjustment to the garment properties without modifying the three-dimensional model; and
display the updated garment cost in the cost assessment user interface;
wherein determining the garment cost comprises:
determining an overall fabric amount for producing a plurality of garments for each size across a size range;
adjusting the overall fabric amount for producing the plurality of garments based on a demand for the garment at each size in the size range, wherein adjusting the overall fabric amount for producing the plurality of garments based on the demand for the garment at each size in the size range comprises:
increasing the overall fabric amount for producing the plurality of garments in response to determining that the demand for the garment of the size is greater than a threshold demand; or
decreasing the overall fabric amount for producing the plurality of garments in response to determining that the demand for the garment of the size is less than the threshold demand; and
calculating, based in part on the overall fabric amount, an average fabric cost for the garment.

2. The cost assessment tool of claim 1, wherein the garment cost comprises one or more of the average fabric cost, a labor cost, a trim cost, a shipping cost, a packaging cost, a duty cost, a tariff cost, an overhead cost, and a miscellaneous cost.

3. The cost assessment tool of claim 1, wherein determining, using the garment properties, the overall fabric amount comprises:
determining a representative size of the garment;
determining a fabric amount for the representative size; and
calculating, by extrapolating from the fabric amount for the representative size, the overall fabric amount for producing the plurality of garments for each size across the size range.

4. The cost assessment tool of claim 1, wherein determining, using the garment properties, the overall fabric amount comprises one or more of:

adjusting, based on a shrinkage amount, the overall fabric amount; or adjusting, based on a waste amount, the overall fabric amount.

5. The cost assessment tool of claim 2, wherein determining, using the garment properties, the garment cost comprises:

determining, using the garment properties, a required trim; and calculating, using the required trim, the trim cost.

6. The cost assessment tool of claim 2, wherein determining, using the garment properties, the garment cost comprises:

determining, using the garment properties, a number of labor hours; and calculating, using the number of labor hours, the labor cost.

7. The cost assessment tool of claim 1, wherein the garment properties comprise one or more of: a garment type; a garment measurement; a fabric type; a fabric pattern; a fabric color; a thread count; a stitch type; a representative size; a manufacturer; manufacturer data; a garment weight; accessory information; brand information; and trim information.

8. The cost assessment tool of claim 7, wherein the instructions, when executed, further cause the cost assessment tool to retrieve garment production data from a garment production database, the garment production data comprising:

historical data associated with one or more of the garment properties or with the garment cost; or economic data associated with one or more of the garment properties or with the garment cost.

9. The cost assessment tool of claim 2, wherein the cost assessment user interface comprises a cost assessment table, the cost assessment table displaying the garment cost separated into sub-costs that include at least the average fabric cost, the shipping cost, and the labor cost.

10. The cost assessment tool of claim 1, the cost assessment user interface further comprising a garment image.

11. The cost assessment tool of claim 1, wherein the instructions, when executed, further cause the cost assessment tool to:

display an option in the cost assessment user interface to edit the three-dimensional model; and respond to an edited garment, wherein responding to the edited garment comprises:

receiving an edited three-dimensional model, the edited three-dimensional model comprising the edited garment;

determining, using the edited three-dimensional model, edited garment properties;

determining, using the edited garment properties, an edited garment cost;

generating an edited cost assessment user interface, the edited cost assessment user interface comprising the edited garment cost.

12. The cost assessment tool of claim 1, wherein the three-dimensional model:

comprises a shape-based model, a polygonal model, a rational basis spline model; or a non-uniform rational basis spline model; or is created using computer-aided design software.

13. The cost assessment tool of claim 1, wherein the garment cost comprises one or more of: a cost of producing one of the garment; a cost of producing a plurality of the garment;

and an average cost of producing the garment.

14. The cost assessment tool of claim 1, wherein the menu for adjusting the garment properties without modifying the three-dimensional model is a pop-up menu that is displayed in response to receiving a selection of an option in the cost assessment user interface to edit the garment properties without modifying the three-dimensional model.

15. The cost assessment tool of claim 1, wherein parsing the three-dimensional model comprises generating a structured data file that includes that garment properties; and wherein the structured data file is an Extensible Markup Language (XML) file or a Javascript Object Notation (JSON) file.

16. The cost assessment tool of claim 1, wherein determining the overall fabric amount for producing the plurality of garments for each size across the size range comprises adding a first fabric amount for producing the garment at a first size in the size range with a second fabric amount for producing the garment at a second size in the size range.

17. A method for assessing cost, the method comprising:

receiving a three-dimensional model, the three-dimensional model comprising a garment;

determining, using the three-dimension model, garment properties;

determining, using the garment properties, a garment cost;

displaying, via a cost assessment user interface, the garment cost and a menu for adjusting the garment properties without modifying the three-dimensional model;

receiving, via a selection in the menu displayed in the cost assessment user interface, an adjustment to the garment properties;

updating the garment cost based on the adjustment to the garment properties without modifying the three-dimensional model; and displaying the updated garment cost in the cost assessment user interface;

wherein determining the garment cost comprises determining an overall fabric amount for producing a plurality of garments for each size across a size range and calculating, based in part on the overall fabric amount, an average fabric cost for the garment;

wherein determining the overall fabric amount comprises:

determining a representative size of the garment;

determining a fabric amount for the representative size; and calculating, by extrapolating from the fabric amount for the representative size, the overall fabric amount for producing the plurality of garments for each size across the size range.

18. The method of claim 17, wherein determining, using the garment properties, the garment cost comprises calculating an estimated material cost, wherein calculating the estimated material cost comprises:

retrieving material information from a garment production database, the material information corresponding to the garment properties;

determining, using the garment properties, an estimated material requirement; and calculating, using the estimated material requirement and the material information, the estimated material cost;

wherein the estimated material cost comprises the average fabric cost.

19. A cost assessment system, the system comprising:

a three-dimensional model parser;

a cost calculator, the cost calculator communicatively coupled to the three-dimensional model parser;

a garment production database, the garment production database communicatively coupled to the cost calculator; and a user interface generator, the user interface generator communicatively coupled to the cost calculator;

wherein the three-dimensional model parser is configured to determine garment properties of a three-dimensional model comprising a garment; and wherein the cost calculator is configured to: receive garment properties from the three-dimensional parser; receive garment production data from the garment production database; and determine, using the garment properties and the garment production data, a garment cost;

wherein the user interface generator is configured to:
generate a cost assessment user interface, the cost assessment user interface comprising the garment cost and a menu for adjusting the garment properties without modifying the three-dimensional model;
receive, via a selection in the menu displayed in the cost assessment user interface, an adjustment to the garment properties;

wherein the cost calculator is further configured to update the garment cost based on the adjustment to the garment properties without modifying the three-dimensional model;

wherein the user interface generator is further configured to display the updated garment cost in the cost assessment user interface; and wherein determining the garment cost comprises:
determining an overall fabric amount for producing a plurality of garments across a size range;
adjusting the overall fabric amount for producing the plurality of garments based on a demand for the garment at each size in the size range, wherein adjusting the overall fabric amount for producing the plurality of garments based on the demand for the garment at each size in the size range comprises:
increasing the overall fabric amount for producing the plurality of garments in response to determining that the demand for the garment of the size is greater than a threshold demand; or
decreasing the overall fabric amount for producing the plurality of garments in response to determining that the demand for the garment of the size is less than the threshold demand; and
calculating, based in part on the overall fabric amount, an average fabric cost for the garment.

* * * * *